United States Patent
Zeidlhofer et al.

(10) Patent No.: US 11,806,907 B2
(45) Date of Patent: Nov. 7, 2023

(54) PLASTICIZING DEVICE FOR A MOLDING MACHINE

(71) Applicant: ENGEL AUSTRIA GmbH, Schwertberg (AT)

(72) Inventors: Herbert Zeidlhofer, Haag (AT); Guenther Klammer, Aschbach Markt (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 203 days.

(21) Appl. No.: 16/875,165

(22) Filed: May 15, 2020

(65) Prior Publication Data

US 2021/0354356 A1 Nov. 18, 2021

(51) Int. Cl.
| | | |
|---|---|---|
| *B29C 45/76* | (2006.01) | |
| *B29C 45/50* | (2006.01) | |
| *B29C 45/80* | (2006.01) | |

(52) U.S. Cl.
CPC .............. *B29C 45/76* (2013.01); *B29C 45/50* (2013.01); *B29C 45/80* (2013.01); *B29C 2945/76096* (2013.01); *B29C 2945/76187* (2013.01); *B29C 2945/76193* (2013.01); *B29C 2945/76665* (2013.01)

(58) Field of Classification Search
CPC ........... B29C 2945/76096; B29C 2945/76187; B29C 2945/7619; B29C 2945/76193; B29C 45/80
See application file for complete search history.

(56) References Cited

U.S. PATENT DOCUMENTS

| | | | | |
|---|---|---|---|---|
| 2015/0037447 | A1* | 2/2015 | Rechter | B29C 48/2564 425/135 |
| 2015/0148932 | A1* | 5/2015 | Rechter | B29C 48/96 700/109 |
| 2021/0039298 | A1* | 2/2021 | Skrabala | B29C 48/40 |

FOREIGN PATENT DOCUMENTS

| | | |
|---|---|---|
| AT | 12 211 | 1/2012 |
| AT | 510 024 | 1/2012 |
| CN | 104339625 | 2/2015 |

(Continued)

OTHER PUBLICATIONS

Translation of AT 510 024 ("Hochreiter") (Year: 2012).*

*Primary Examiner* — Xiao S Zhao
*Assistant Examiner* — John J DeRusso
(74) *Attorney, Agent, or Firm* — Wenderoth, Lind & Ponack, L.L.P.

(57) ABSTRACT

A plasticizing device includes a plasticizing cylinder and a plasticizing screw arranged in the plasticizing cylinder. The plasticizing screw is rotatable about, and linearly movable along, a longitudinal axis. The plasticizing screw comprises a functioning section. A sensor is arranged in or on the plasticizing cylinder, and a distance to the surface of the functioning section of the plasticizing screw can be measured by the sensor. A detecting device can detect a type of the functioning section and/or an operating state of the functioning section, can detect a distance signal progression by a movement of the functioning section relative to the sensor, can compare the detected distance signal progression with a stored distance signal progression, and can issue a signal representing the type of functioning section and/or the operating state of the functioning section depending on a matching of the detected distance signal progression with a stored distance signal progression.

22 Claims, 9 Drawing Sheets

(56) References Cited

FOREIGN PATENT DOCUMENTS

| | | |
|---|---:|---:|
| CN | 104647725 | 5/2015 |
| CN | 105848848 | 8/2016 |
| DE | 44 45 352 | 1/1996 |
| DE | 10 2011 103 810 | 1/2012 |
| DE | 10 2012 008 884 | 11/2012 |
| DE | 10 2017 009 046 | 3/2019 |
| DE | 10 2017 129 232 | 6/2019 |
| DE | 10 2019 122 499 | 2/2020 |
| JP | 5-309721 | 11/1993 |
| JP | 2012-11622 | 1/2012 |

\* cited by examiner

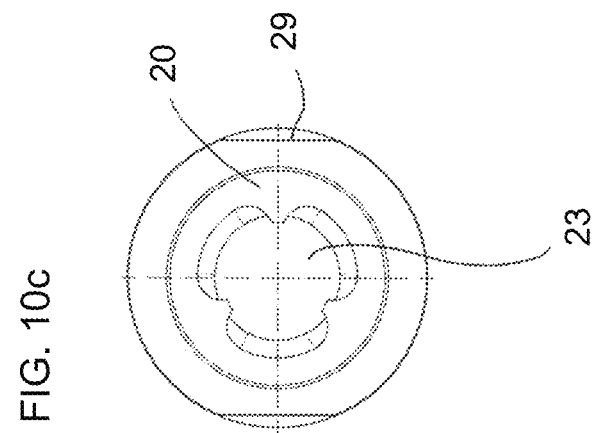
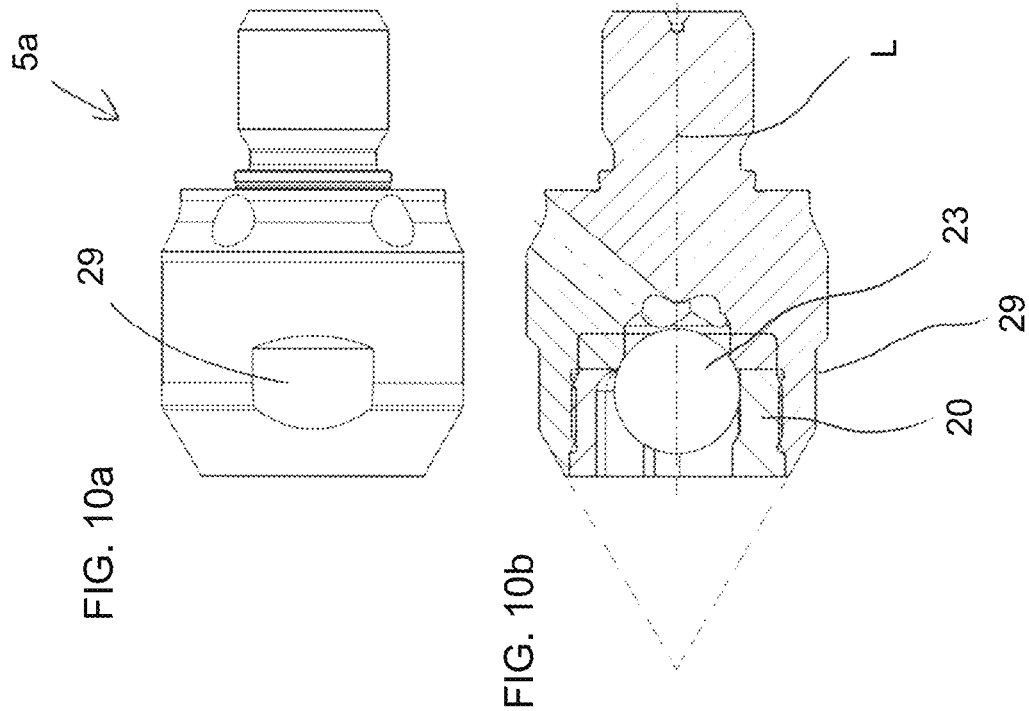

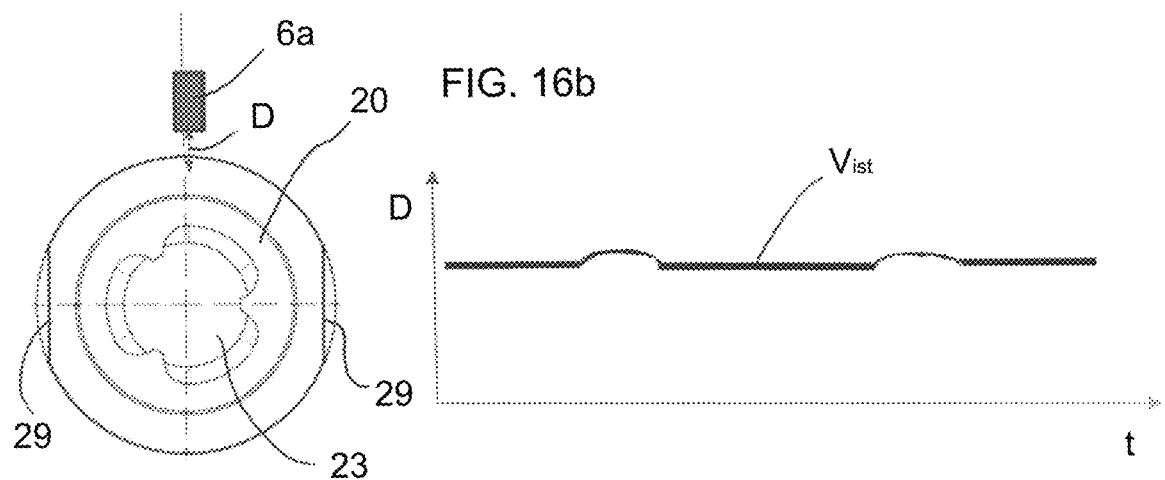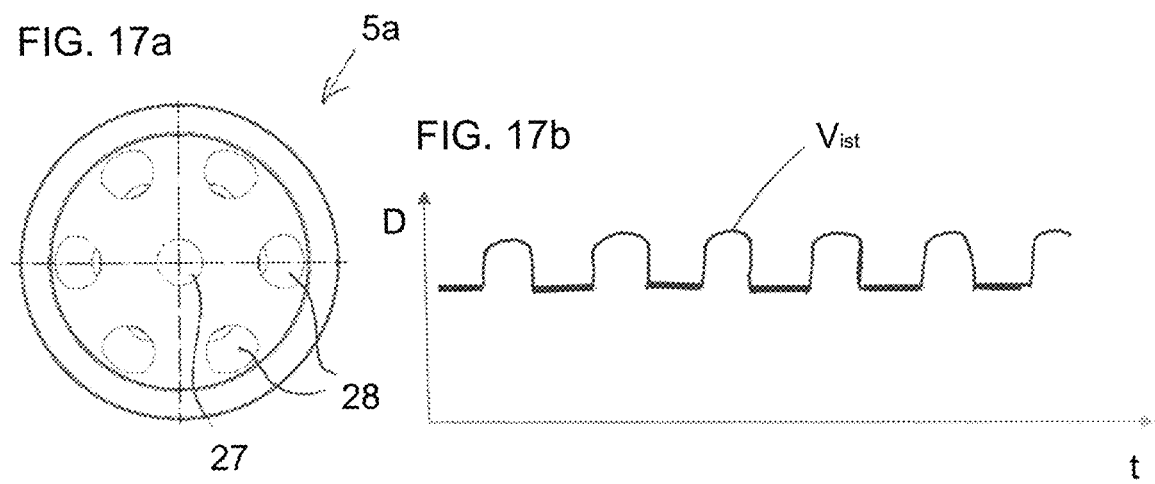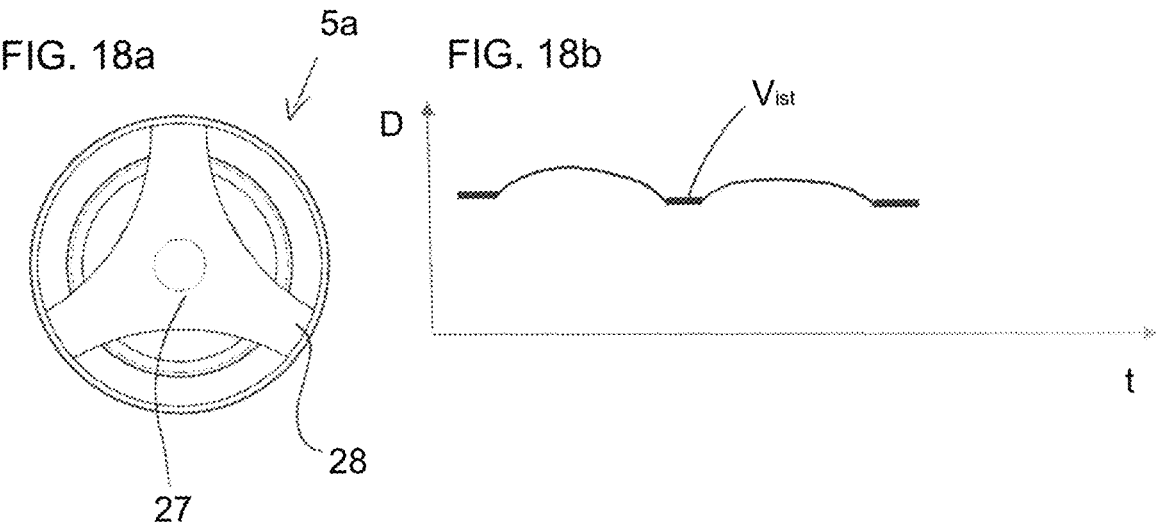

PLASTICIZING DEVICE FOR A MOLDING MACHINE

BACKGROUND OF THE INVENTION

The present invention concerns a plasticizing device for a molding machine, in particular for an injection molding machine or an injection press, comprising a plasticizing cylinder, and a plasticizing screw arranged in the plasticizing cylinder, in which the plasticizing screw is rotatable about a longitudinal axis and is linearly movable along the longitudinal axis. The plasticizing screw comprises at least one functioning section, and a sensor arranged in or on the plasticizing cylinder. A distance to the surface of the at least one functioning section of the plasticizing screw can be measured by the sensor. Moreover, the present invention concerns a molding machine comprising such a plasticizing device and a method for operating a plasticizing device.

Different functioning sections are used in the molding process depending on the demands. For example, a functioning section can be a return flow shut-off device, a screw flight zone of the plasticizing screw, a mixing head or a mixing device. Depending on the used type of the functioning section, specific processing parameter limits or recommendations must be observed. It is disadvantageous that the functioning section is no longer visible for the user after the assembly of the plasticizing device.

DE 10 2011 103 810 A1 teaches a plasticizing unit with a wear sensor. A signal is issued by an evaluation unit as soon as distance—measured by a measuring sensor—between the plasticizing cylinder and the plasticizing screw reaches a determinable threshold. An abrasion curve can be displayed too. With this system, however, only the wear of the plasticizing screw can be deduced without having a direct view into the inside of the plasticizing cylinder.

SUMMARY OF THE INVENTION

The object of the present invention, thus, is to provide an improved plasticizing device compared to the prior art. In particular, the known disadvantages shall be avoided. Especially, a possibility for an improved analysis shall be provided without the necessity of dismounting the plasticizing screw.

A plasticizing device includes a detecting device for detecting a type of a functioning section and/or an operating state of the functioning section. The detecting device is configured to detect a distance signal progression generated by a movement of the functioning section relative to the sensor, to compare the detected distance signal progression with a stored distance signal progression, and to issue a signal representing the type of the functioning section and/or the operating state of the functioning section depending on a matching of the detected distance signal progression with a stored distance signal progression. Thus, an autonomous detection of the integrated functioning section of the plasticizing screw is possible with the necessity of dismounting the plasticizing screw.

All of those sections of a plasticizing screw or of a "non-visible" part "hid" and arranged in a plasticizing cylinder which fulfil a certain function during the plasticizing and injection process can be denoted as functioning sections. Specifically, a return flow shut-off device, a screw flight zone of the plasticizing screw or a mixing device forms such a functioning section. The functioning section can also be denoted as a component for conducting a process step.

The distance signal progression per se can illustrate or represent the progression of the distance of the (distance) sensor to a random section and to a random component of the functioning section. Preferably, the distance signal progression represents the surface contour of the functioning section. This means, the surface of the functioning section is scanned and a distance signal progression is generated thereof. Thus, the type of the functioning section results from the (detected) form of the functioning section. The surface contour, thus, serves as means of identification for the type of functioning section.

As an alternative (or additionally), a surface code formed in the functioning section serves or functions as a means of identification for detecting the type of the functioning section. Specifically, this surface code can be formed by an additionally generated or attached (procedural optimized) geometry element in the form of a protrusion or a recess. As an example it can be referred to grooves, webs, drills and similarly build parts for the purpose of series or component identification. For example, also a (geometrical) surface code can be lasered into the plasticizing screw, preferably in its functioning section.

With this detection device, however, not only the type can be detected, but the operating state of the functioning section can be detected alternatively or additionally. An operating state, for example, can be the switch position of the functioning section. With reference to the functioning section in the form of a return flow shut-off device, for example, the switch position can be distinguished in "closed" and "open". Based on the distance signal progression, thus, it can be deduced whether the return flow shut-off device is actually open or closed and a corresponding signal can be emitted. Also the movements of the shut-off ring or the oscillation (orbital movement) of the tip can be detected in order to identify the operating state of the plasticizing screw. If process parameters are not adjusted in an optimal manner the plasticizing screw and, thus, also the shut-off device in the cylinder are oscillating.

It is also possible that, for example, the wear of the return flow shut-off device (e. g. a shortening of the tip wings) or the length of the shut-off ring is measured by the detection device. Likewise, the number of the balls used in the return flow shut-off device can be determined.

The identification of the type or of the operating state does not have to be carried out in each cycle. The detecting device can be configured for example in such a way that a detection of the type of the functioning section and/or of the operating state of the functioning section is carried out only after a stopping of the machine or after a standstill which lasts longer than a predetermined time.

A default or recommendation of processing parameters for the optimized lifetime and for the safe operation can be derived from the detected type of the functioning section and/or from the operating state. Thus, if a certain type or operating state is detected, this detected value is compared with the predetermined processing parameters. If there is a deviation, a warning signal can be emitted or an (automatic) modification or adaptation of the processing parameters can be carried out. Possible processing parameters and its limits can be speed, temperature of the tempering device, temperature profile, compression discharge, metering stroke (shot weight) and ramps as well as the validation/applicability of the implemented components concerning specific plastic materials.

The detected data facilitates an operation data detection. In particular, this can be used for the calculation of a load collective (cumulated load). In this way it can be calculated how long a return flow shut-off device has been used in the production based on different parameters. Therefore, also a preventive maintenance is possible: As soon as a certain working time is reached, maintenance can be carried out (again). As a consequence the maintenance intervals can be controlled. Especially, this results in variable maintenance intervals which are adapted to the actual needs.

According to a preferred embodiment, the stored distance signal progression is stored in a data memory of the plasticizing device or is retrievable from a cloud via a data line.

Further, preferably the detection of the distance signal progression is carried out when the plasticizing screw is rotated (about the longitudinal axis), when the plasticizing screw is linearly moved along the longitudinal axis, or when the plasticizing screw is rotated (about the longitudinal axis) and moved translationally.

The stored distance signal progression can be based on a distance signal progression predetermined for the functioning section. This means, when implementing the plasticizing screw, a reference distance signal progression adapted to its functioning section or to its functioning sections can be stored. This reference distance signal progression can be provided by the producer of the plasticizing screw. As an alternative, it is possible that after the assembly of the plasticizing screw a single detection run is carried out. With this detection run a distance signal progression (graph) is detected and stored in order to enable a comparison afterwards. Again another alternative: Progression values which are specific for a functioning section at a defined rate of rotation and in a defined movement can be recorded and compared.

The following components or sections/regions can build specific functioning sections:

- When the functioning section is formed as a return flow shut-off device, the type of the functioning section is a ball shut-off device, a wing shut-off device, a guide path shut-off device, a multi-ball shut-off device or a ring return flow shut-off device.
- When the functioning section is formed as a screw flight zone, the type of the functioning section is a single-channel screw, a barrier screw, a two-channel screw, a metering zone, a compression zone or a feed zone.
- When the functioning section is formed as a mixing device, the type of the functioning section is a tooth lock washer mixing device, a faceted mixing device, a shear mixing device, a shear part, a coiled shear part or a Maddock mixing device.

The measurement of the distance can be carried out per se with each suitable sensor. Preferably, the sensor is formed as a sound sensor (preferably as an ultrasound sensor), as an electromagnetic sensor, or as a capacitive sensor Further, preferably the sensor comprises at least one measuring head. Preferably, at least two measuring heads are provided which are distanced from each other along the longitudinal axis or along a circumference of the plasticizing screw.

The at least one measuring head can be arranged in the interior of the plasticizing cylinder. The measuring head can also be arranged distanced to the plasticizing cylinder. Preferably, however, the at least one measuring head is arranged on the plasticizing cylinder, preferably on the external side of the plasticizing cylinder, particularly preferred in a drilled pocket formed on the external side of the plasticizing cylinder. Also when two measuring heads are provided, the measuring heads can be arranged in a drilled pocket each.

A control or regulating unit (also open loop or closed loop control system) for controlling or regulating movements of the plasticizing screw can be provided. This control or regulating unit preferably comprises a display device, preferably a screen, and an input device, preferably in the form of a keyboard. This control or regulating unit can be part of a superior machine control for the entire molding machine.

The detection device can be formed as a part of the control or regulating unit. As an alternative, the detection device can be in a signaling connection with the control or regulating unit.

Also described is a molding machine comprising a plasticizing device according to the invention.

The above-mentioned object is also solved by a method in which a detection of a type of the functioning section and/or the operating state of the functioning section is carried out by the steps moving the function section relative to the sensor, detecting a distance signal progression, comparing the detected distance signal progression with a stored distance signal progression, and issuing (emitting) a signal representing the type of the functioning section and/or the operating state of the functioning section depending on a matching of the detected distance signal progression with a stored distance signal progression.

BRIEF DESCRIPTION OF THE DRAWINGS

Further details and advantages of the present invention are described more fully hereinafter by means of the specific description with reference to the embodiments by way of example illustrated in the drawings, in which:

FIG. 16a is a front view corresponding to FIG. 10c, FIG. 16b is a diagram with a distance signal progression corresponding to FIG. 16a, FIG. 17a is a front view corresponding to FIG. 11c, FIG. 17b is a diagram with a distance signal progression corresponding to FIG. 17a, FIG. 18a is a front view corresponding to FIG. 12c and FIG. 18b is a diagram with a distance signal progression corresponding to FIG. 18a.

DETAILED DESCRIPTION OF THE INVENTION

Figure 1:
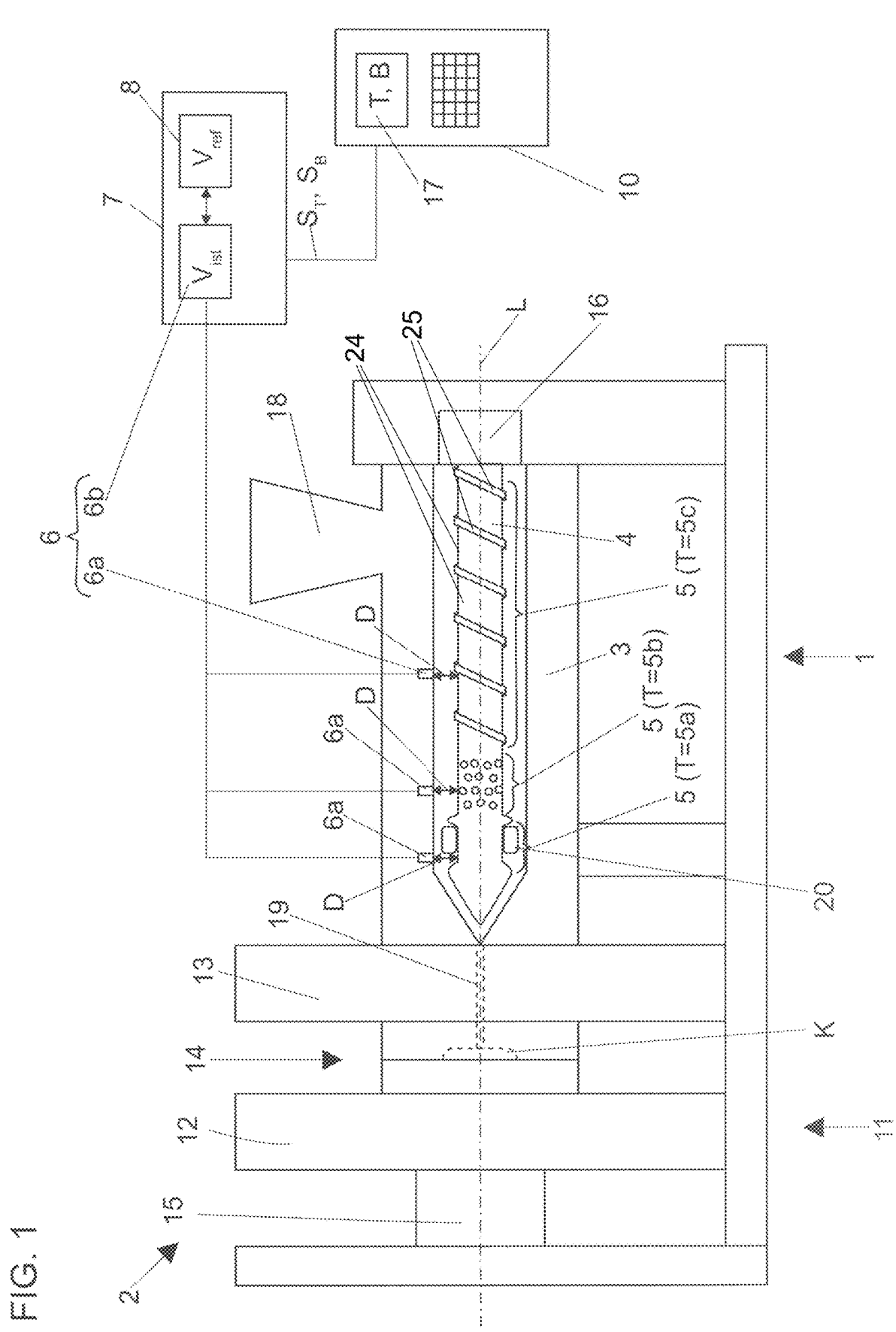
FIG. 1 is a schematic side view of a molding machine with a plasticizing device.

In FIG. 1, a molding machine 2 is illustrated in a schematic side view. This molding machine 2 comprises a closing unit 11 (illustrated on the left side). This closing unit 11 comprises a movable mold mounting plate 12, a stationary mold mounting plate 13, a mold tool 14 mounted to the mold mounting plates 12 and 13 and a drive device 15 (for example in the form of a toggle lever system) for the movable mold mounting plate 12. At least one cavity K is formed in the closed mold tool 14.

The molding machine 2 comprises a plasticizing device 1 (illustrated on the right side). This plasticizing device 1 comprises a plasticizing cylinder 3 and a plasticizing screw 4 which is arranged in the plasticizing cylinder 3, the plasticizing screw 4 being rotatable about a longitudinal axis L and being linearly movable along the longitudinal axis L. The plasticizing screw 4 is driven by a—for example electromotive—drive device 16. The feed hopper 18 fills plastic material, preferably in the form of granules, into the plasticizing cylinder 3, and the plastic material is melted therein. Melted plastic material is injected into the cavity K in the mold tool 14 by the injection channel 19. Then, the injected plastic material is hardening in the cavity K and finally forms at least one molded part (injection-molded part).

The plasticizing screw 4 comprises at least one functioning section 5. Three exemplary functioning sections 5 are illustrated in FIG. 1—a return flow shut-off device 5a, a mixing device 5b and a screw flight zone 5c. A measuring head 6a of a sensor 6 is associated to each of these functioning sections 5. Each measuring head 6a together with an evaluation unit 6b forms a sensor 6.

The plasticizing device 2 comprises a detecting device 7 for detecting the type T of the functioning section 5 and/or the operating state B of the functioning section 5. A distance signal progression V is detected by the sensor 6 by moving the functioning section 5 relative to the sensor 6. Specifically, the measuring head 6a of the sensor 6 detects the distance D to the surface of the functioning section 5. During the movement of the plasticizing screw 4 relative to the plasticizing cylinder 3 a new value of the distance D is detected in constant temporal intervals (for example in the range of milliseconds). The entire detected measuring values of the distance D result in a detected distance signal progression $V_{ist}$. This detected distance signal progression $V_{ist}$ is compared with at least one stored (preferably in a memory 8) distance signal progression $V_{ref}$. A signal $S_T$ or $S_B$ representing the type T of the functioning section 5 and/or the operating state B of the functioning section 5 is issued (emitted) depending on a matching of the detected distance signal progression $V_{ist}$ with a stored distance signal progression $V_{ref}$.

The plasticizing device 1 comprises a control or regulating unit 10 (can also be defined as open loop or closed loop control device). The detecting device 7 is signally connected with this control or regulating unit 10. Preferably, the signal $S_T$ or $S_B$ representing the type T or the operating State B is transmitted to this control or regulating unit 10. The type T or the operating state B of the checked functioning section 5 detected by the detecting device 7 can be displayed by the screen 17. The detected type T or the detected operating state B does not have to be displayed, but rather the corresponding signal can be used or considered when controlling or regulating the movement of the plasticizing screw 4. The operating state B, for example, can represent two switch positions of the functioning section 5. Specifically, the operating state B can represent the switch position ("closed" or "open") of the shut-off ring 20 of the return flow shut-off device 5.

Figure 2:
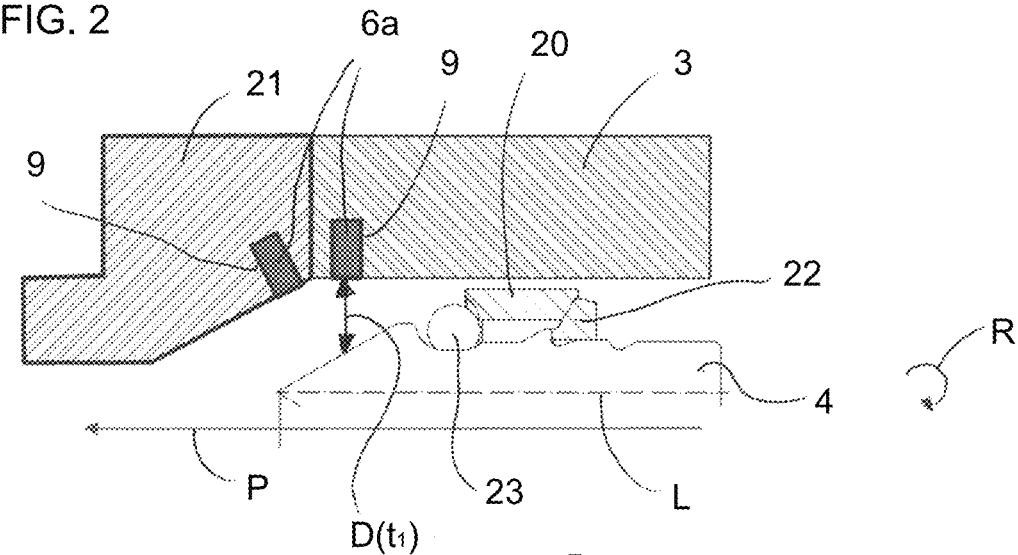
FIG. 2-4 are cross sections through the plasticizing cylinder in different positions of the plasticizing screw along the longitudinal axis, FIG. 5+6 are radial cross sections through the plasticizing cylinder with different rotary positions of the plasticizing screw.

FIG. 2 shows a cross section through the plasticizing cylinder 3 with a plasticizing screw 4. The plasticizing cylinder comprises a flange 21. Drilled pockets 9 are formed on the interior side of the plasticizing cylinder 3. A measuring head 6a of a sensor 6 is arranged in each of these drilled pockets 9. The functioning section 5 is formed as a return flow shut-off device 5a. The return flow shut-off device 5a comprises a shut-off ring 20, the limit stop 22 (in this case in the form of a pressure ring) and several balls 23 (in this case in the form of bearing balls). The plasticizing screw 4 is situated in a forward movement which is indicated by the movement arrow P. Simultaneous, a rotary movement about the rotary axis of the plasticizing screw 3 takes place (see movement arrow R). The distance D at the point in time $t_1$ is detected by the measuring head 6a.

Figure 3:
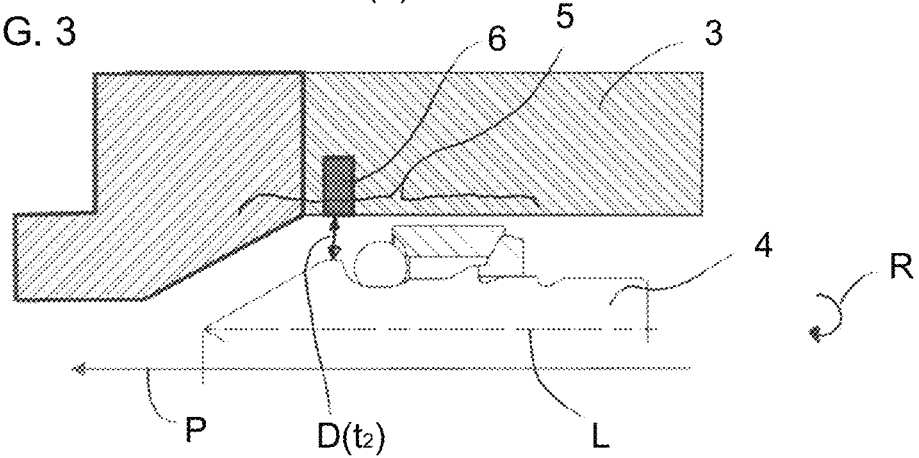

In FIG. 3, again, a cross section through the same plasticizing cylinder 3 is illustrated, wherein the plasticizing screw 4 has already moved forward. In this case no second measuring head 6a is illustrated. The distance D to the surface of the functioning section 5 at the point in time $t_2$ is detected by the measuring head 6a arranged in the plasticizing cylinder 3.

Figure 4:
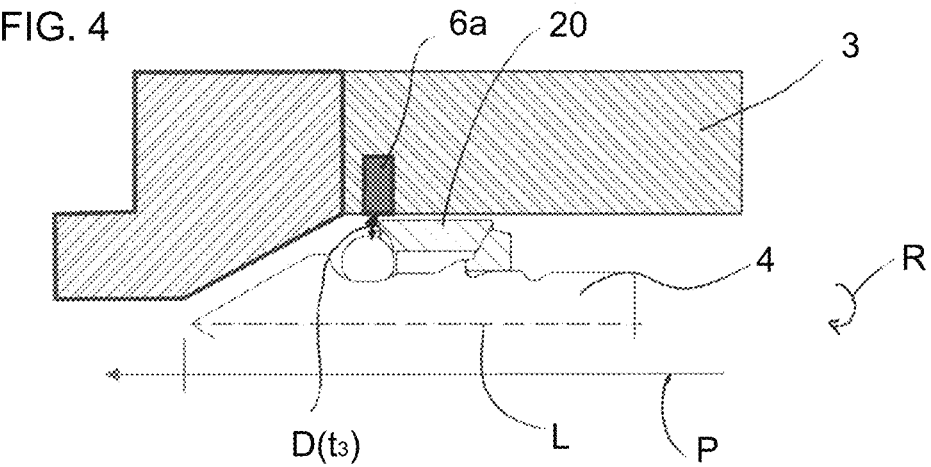

According to FIG. 4, the distance D to the surface of the functioning section 5 at the point in time $t_3$ is detected in the same way. In this position according to FIG. 4 the forward movement of the plasticizing screw 4 completed. However, there is still a further rotary movement.

Figure 5:
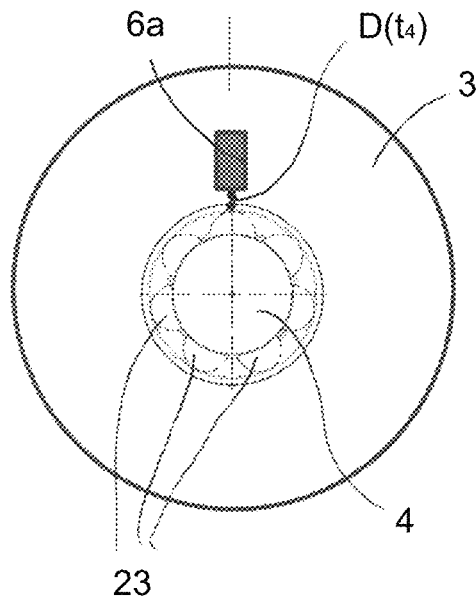

Correspondingly, FIG. 5 shows a radial cross section through the plasticizing cylinder 3 together with the plasticizing screw 4. The balls 23 of the return flow shut-off device 5a are visible. These balls 23 are arranged around the plasticizing screw 4 in constant distances to each other. The measuring head 6a measures the distance D to the surface (specifically to the locking ball 23) of the functioning section 5 at the point in time $t_4$.

Figure 6:
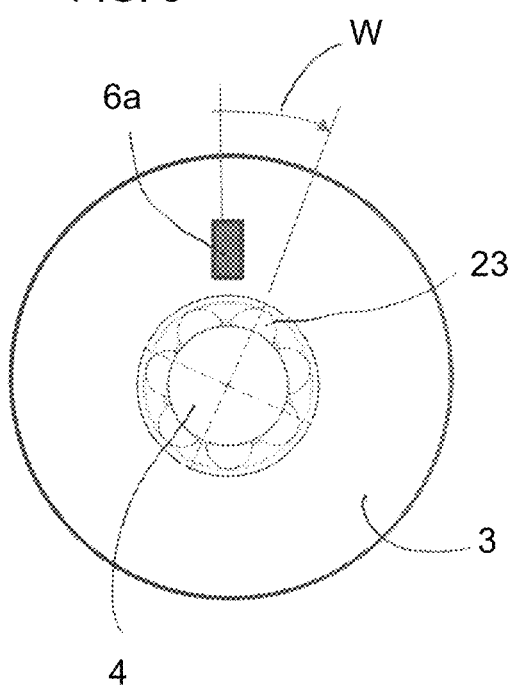

According to FIG. 6, the plasticizing screw 4 has been further rotated about the angle W. As a consequence, the distance D between the measuring head 6a and the functioning section 5 has increased. This distance D corresponds to the point in time $t_5$.

Figure 7:
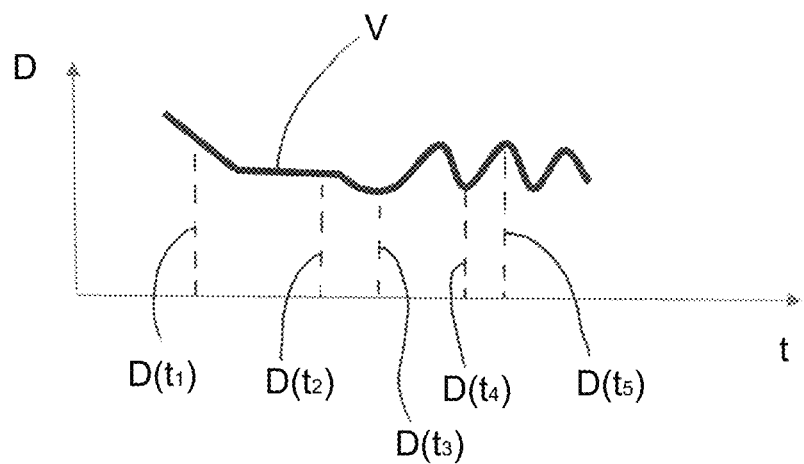
FIG. 7 is a diagram with an exemplary distance signal progression.

The recorded distances D at the points in time $t_1$ to $t_5$ are combined to a distance signal progression V by the detection device 7. An exemplary distance signal progression V is illustrated in the diagram according to FIG. 7. The distance D detected by the sensor 6 is indicated on the ordinate of this diagram. The time t is indicated on the abscissa of this diagram. As an example the distances D at the different points in time $t_1$ to $t_5$ are indicated. This distance signal progression V can correspond to a detected distance signal progression $V_{ist}$ or to a stored distance signal progression $V_{ref}$.

The FIGS. 2 to 7 can be described in other words as follows: A measuring region of a sensor 6 scans the plasticizing screw 4 during a forward or backward movement of the plasticizing screw 4. The sensor 6 can be mounted in the flange 21 or in the plasticizing cylinder 3. The sensor 6 can be formed as an ultrasound sensor. During the axial movement, the distances D to the contour of the screw tip and the components connected therewith are measured and recorded. The resulting signal represents the distance D to a reflection surface or a topography on one or on several components of the plasticizing screw 4 (for example on a return flow shut-off device 5a or on mixing parts). During the movement the distance signal progression V is determined depending on the time t, the position along the longitudinal axis L and the angle W which is scaled with the rate of rotation. Depending on the basic form of the functioning section 5, a characteristic progression occurs which can be distinctly associated to the type T of the functioning section 5. In order to compare the characteristic distance signal progressions V, these progressions are set in relation depending on the position during the temporal progression and the rate of rotation, whereupon the detected graphs are compared by superimposition.

Figure 8:
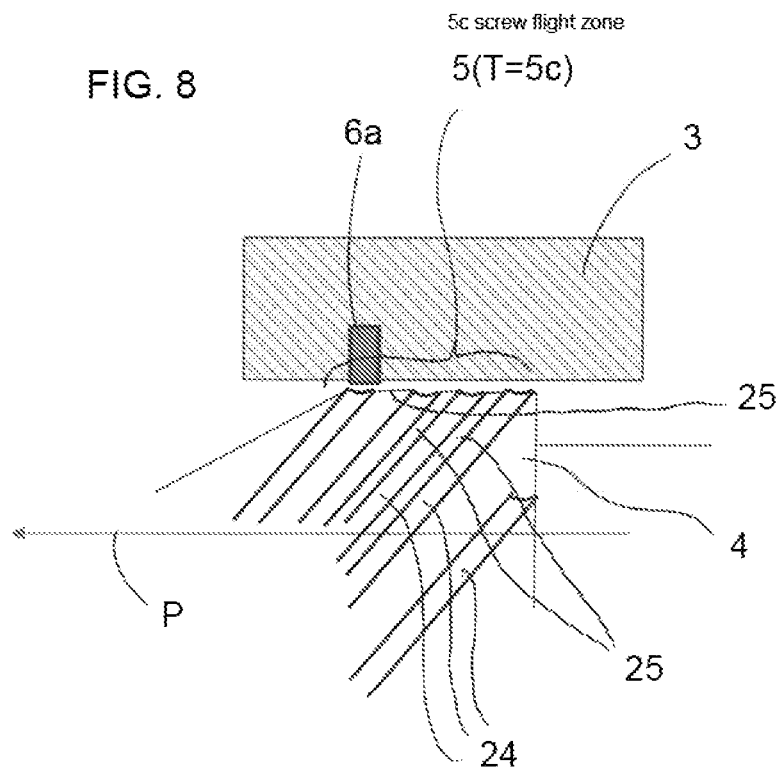
FIG. 8 is a schematic cross section through a plasticizing cylinder and a plasticizing screw.

In FIG. 8, a schematic cross section through a plasticizing cylinder 3 and a plasticizing screw 4 is illustrated. The plasticizing screw 4 comprises a functioning section 5 in the form of a screw flight zone 5c. This screw flight zone 5c comprises one or several screw channels 24 which are helically wound around the plasticizing screw 4.

Figure 9:
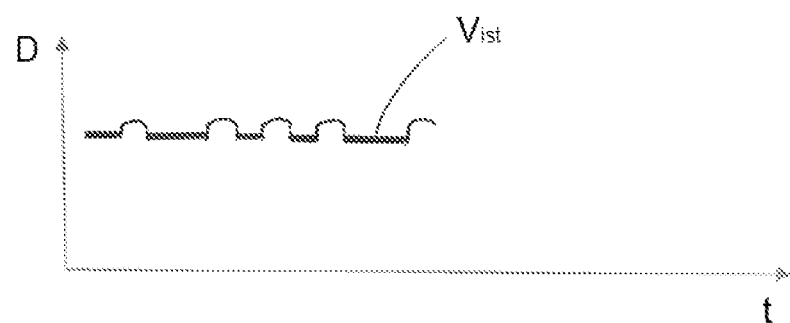
FIG. 9 is a diagram with a distance signal progression corresponding to FIG. 8, FIG. 10a-10c are different illustrations of a return flow shut-off device in the form of a single-ball shut-off device.

When the plasticizing screw 4 according to FIG. 8 is moving in the direction of the movement arrow P and/or when the plasticizing screw 4 is rotating about the longitudinal axis L, the distance signal progression $V_{ist}$ is detected by the sensor 6. This is illustrated in FIG. 9. The elevations in the distance signal progression $V_{ist}$ correspond to the groove-shaped screw channels 24 because here the distance D to the sensor 6 is larger than in the region of the screw flights 25. The detected distance signal progression $V_{ist}$ results in a characteristic signal which is compared with a stored distance signal progression $V_{ref}$. Depending on a matching, the identified type T of the functioning section 5 is issued. Stored distance signal progressions $V_{ref}$ can be stored digitally in a type of digital library.

The FIGS. 10a, 10b and 10c show different illustrations of a return flow shut-off device 5a. FIG. 10a shows a lateral view, FIG. 10b shows a cross section and FIG. 10c shows a front view. In this embodiment the return flow shut-off device 5a is formed as a so-called single-ball shut-off device with one single (locking) ball 23 and a shut-off ring 20.

Figure 11C:
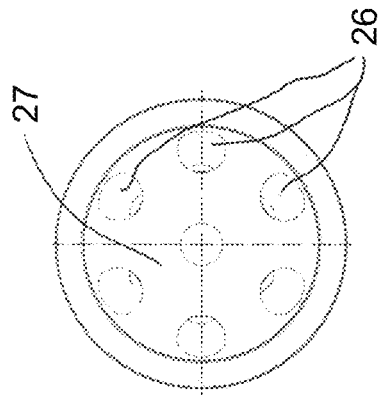
FIG. 11a-11c are different illustration of a return flow shut-off device in the form of a central ball shut-off device, FIG. 12a+12b are different illustrations of a return flow shut-off device in the form of a multi-wing shut-off device.
Figure 11A:
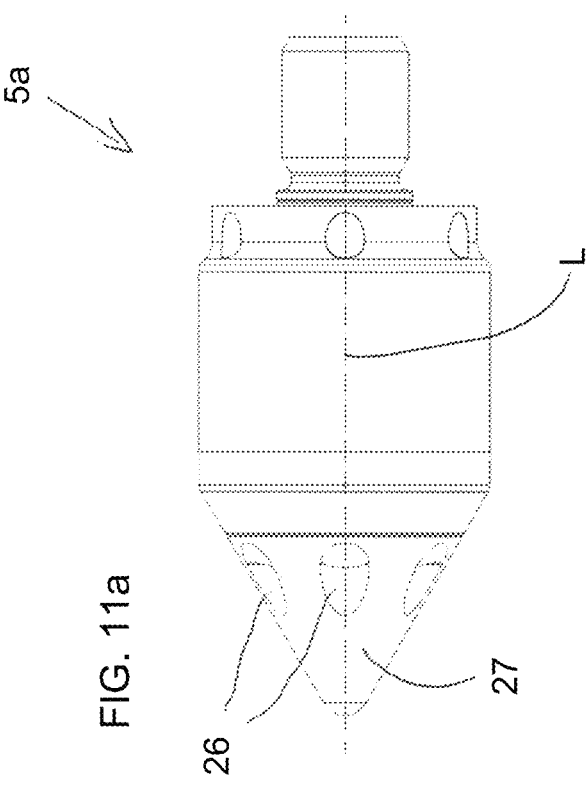

In contrast, the FIG. 11a (lateral view), 11b (cross section) and 11c (front view) show a return flow shut-off device 5a in the form of a central ball shut-off device. Here, the ball 23 together with the ball seating forms a ball valve. In the region of the screw tip 27 this return flow shut-off device 5a comprises several outflow openings 26 arranged around the longitudinal axis L and in constant distances to each other.

Figure 12B:
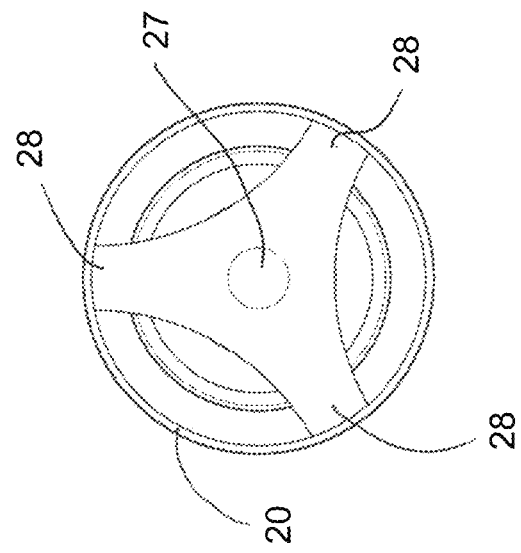

The FIGS. 12 (cross section) and 12b (front view) show a ring return flow shut-off device 5a in the form of a multi-wing shut-off device. In this embodiment the multi-wing shut-off device comprises three wings 28. These wings 28 are arranged constant distances to each other around the longitudinal axis L.

Figure 13:
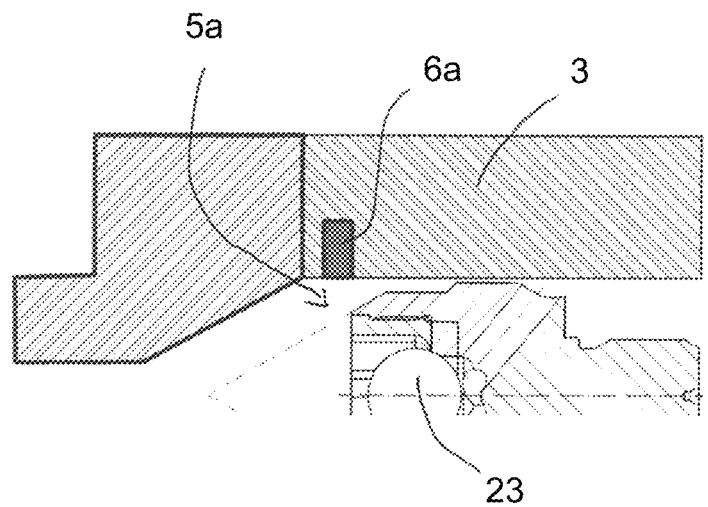
FIG. 13 is a cross section corresponding to the FIGS. 10a to 10c.

FIG. 13 shows a return flow shut-off device 5a according to FIG. 10b which is arranged in a plasticizing cylinder 3.

Figure 11B:
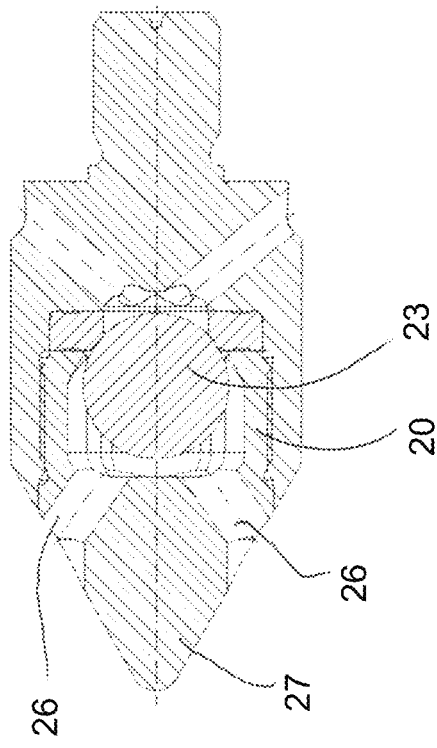
Figure 14:
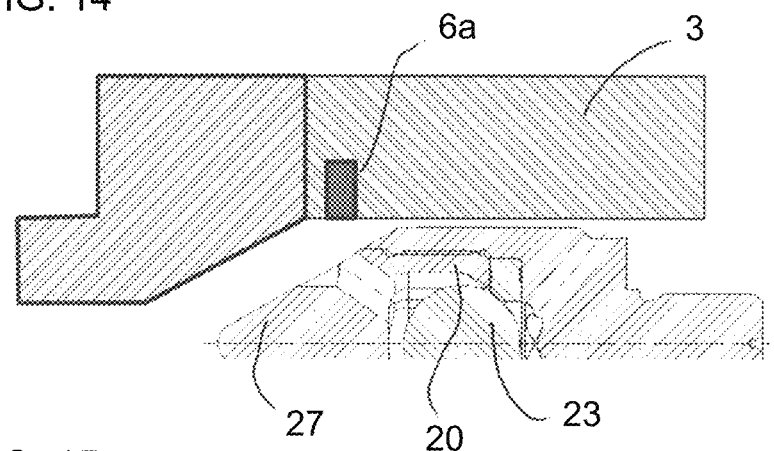
FIG. 14 is a cross section corresponding to the FIG. 11a to 11c.

FIG. 14 shows a return flow shut-off device 5a according to FIG. 11b which is arranged in a plasticizing cylinder 3 together with a measuring head 6a.

Figure 12A:
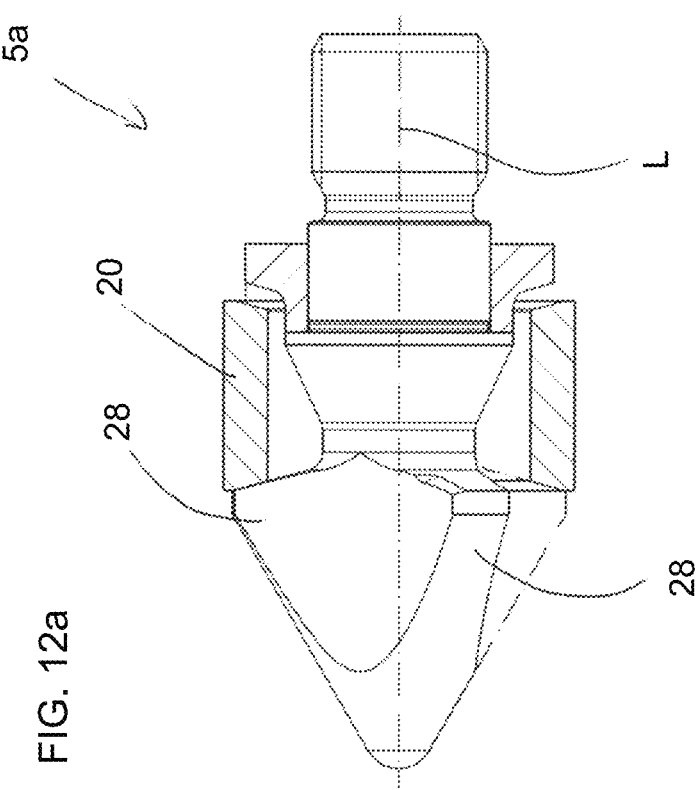
Figure 15:
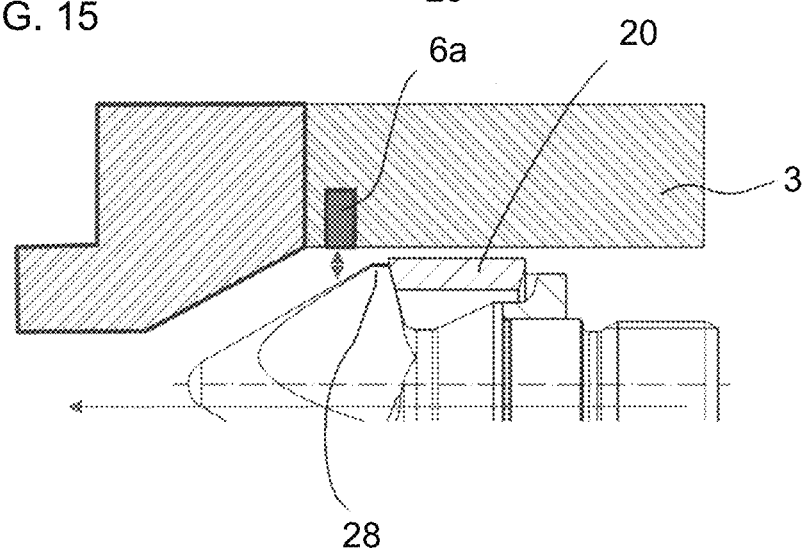
FIG. 15 is a cross section corresponding to the FIGS. 12a and 12b.

FIG. 15 shows a return flow shut-off device 5a according to FIG. 12a arranged in a plasticizing cylinder 3.

FIG. 16a shows the front view according to FIG. 10c and schematically the measuring head 6a. During the rotation of the plasticizing screw 4 the measuring head 6a scans the functioning section 5—in this embodiment the surface of the return flow shut-off device 5a is formed as a central ball shut-off device. The characteristic distance signal progression $V_{ist}$ according to FIG. 16b results from this scanning.

The elevations in the distance signal progression $V_{ist}$ correspond to the lateral flattenings 29 on the return flow shut-off device 5a.

In contrast, FIG. 17a shows the front view according to FIG. 11c. The distance signal progression $V_{ist}$ according to FIG. 17b results from scanning the surface by means of the measuring head 6a (as indicated in FIG. 14). The regularly arranged elevations (see the larger distance D) are easily conceivable. These elevations correspond to the single outflow openings 28 of the screw tip 27.

FIG. 18a shows the front view according to FIG. 12 of a return flow shut-off device 5a in the form of a multi-wing shut-off device. The elevations in the detected distance signal progression $V_{ist}$ shown in FIG. 18b correspond to the notches between the wings 28 of the screw tip 27.

LIST OF REFERENCE SIGNS 1 plasticizing device
2 molding machine
3 plasticizing cylinder
4 plasticizing screw
5 functioning section
5a return flow shut-off device
5b mixing device
5c screw flight zone
6 sensor
6a measuring head
6b evaluation unit
7 detecting device
8 data memory
9 drilled pocket
10 control or regulating unit
11 closing unit
12 movable mold mounting plate
13 stationary mold mounting plate
14 mold tool
15 drive device for the movable mold mounting plate
16 drive device for the plasticizing screw
17 screen
18 feed hopper
19 injection channel
20 shut-off ring
21 flange
22 limit stop
23 balls (locking ball or bearing ball)
24 screw channel
25 screw flights
26 outflow openings
27 screw tip
28 wings
29 lateral flattenings
L longitudinal axis
D distance
T type of the functioning section
B operating state of the functioning section
V distance signal progression
$V_{ist}$ detected distance signal progression
$V_{ref}$ stored distance signal progression
$S_T$ signal representing the type
$S_B$ signal representing the operating state
P movement arrow
R movement arrow
W angle
K cavity
$t_1$-$t_5$ points in time
t time

The invention claimed is:

1. A plasticizing device for a molding machine comprising:
   a plasticizing cylinder;
   a plasticizing screw arranged in the plasticizing cylinder, the plasticizing screw being rotatable about a longitudinal axis and being linearly movable along the longitudinal axis, and the plasticizing screw comprising a functioning section;
   a sensor arranged in or on the plasticizing cylinder, the sensor being configured to measure a distance to a surface of the functioning section of the plasticizing screw; and
   a detecting device configured to detect a type of the functioning section during operation of the plasticizing screw as the plasticizing screw is moved linearly and rotationally, the detecting device being configured to:
      detect a distance signal progression generated by a movement of the functioning section relative to the sensor as the plasticizing screw is moved linearly and rotationally,
      compare the detected distance signal progression with a stored distance signal progression, and
      issue a signal representing the type of the functioning section based on a match between the detected distance signal progression and the stored distance signal progression.

2. The plasticizing device as set forth in claim 1, wherein the functioning section is a return flow shut-off device, a screw flight zone of the plasticizing screw, or a mixing device.

3. The plasticizing device as set forth in claim 1, wherein the detecting device is further configured to detect a surface contour of the functioning section, the detected distance signal progression and the stored distance signal progression being generated to represent the surface contour of the functioning section.

4. The plasticizing device as set forth in claim 1, wherein the functioning section has a surface code therein, and the detecting device is further configured to detect the surface code formed in the functioning section as identification for determining the type of the functioning section.

5. The plasticizing device as set forth in claim 4, wherein the surface code comprises a protrusion or a recess in the functioning section.

6. The plasticizing device as set forth in claim 1, wherein the stored distance signal progression is stored in a data memory of the plasticizing device or is retrievable from a cloud via a data line.

7. The plasticizing device as set forth in claim 1, wherein:
   when the functioning section is a return flow shut-off device, the type of the functioning section is a ball shut-off device, a wing shut-off device, a guide path shut-off device, a multi-ball shut-off device, or a ring return flow shut-off device,
   when the functioning section is a screw flight zone, the type of the functioning section is a single-channel screw, a barrier screw, a two-channel screw, a metering zone, a compression zone, or a feed zone, and
   when the functioning section is a mixing device, the type of the functioning section is a tooth lock washer mixing device, a faceted mixing device, a shear mixing device, a shear part, a coiled shear part, or a Maddock mixing device.

8. The plasticizing device as set forth in claim 1, wherein the sensor is an ultrasound sensor, an electromagnetic sensor, or a capacitive sensor.

9. The plasticizing device as set forth in claim 1, wherein the sensor comprises a measuring head.

10. The plasticizing device as set forth in claim 9, wherein the sensor further comprises an evaluation unit connected with the measuring head.

11. The plasticizing device as set forth in claim 9, wherein the measuring head is arranged on the plasticizing cylinder.

12. The plasticizing device as set forth in claim 9, wherein the measuring head is arranged on an external side of the plasticizing cylinder.

13. The plasticizing device as set forth in claim 12, wherein the measuring head is arranged in a drilled pocket on the external side of the plasticizing cylinder.

14. The plasticizing device as set forth in claim 1, further comprising a control or regulating unit for controlling or regulating movements of the plasticizing screw.

15. The plasticizing device as set forth in claim 14, wherein the detecting device is part of the control or regulating unit or is in a signaling connection with the control or regulating unit.

16. The plasticizing device as set forth in claim 1, wherein the sensor comprises at least two measuring heads separated from each other along the longitudinal axis or along a circumference.

17. The plasticizing device as set forth in claim 1, wherein the detecting device is further configured to detect an operating state of the functioning section and to issue a signal representing the operating state of the functioning section.

18. A molding machine comprising the plasticizing device as set forth in claim 1.

19. A method for operating a plasticizing device of a molding machine, wherein the plasticizing device comprises:
   a plasticizing cylinder,
   a plasticizing screw arranged in the plasticizing cylinder, the plasticizing screw being rotatable about a longitudinal axis and being linearly movable along the longitudinal axis, and the plasticizing screw comprising a functioning section, and
   a sensor arranged in or on the plasticizing cylinder, the sensor being configured to measure a distance to a surface of the functioning section of the plasticizing screw,
   wherein the method comprises detecting a type of the functioning section by:
      moving the functioning section relative to the sensor,
      detecting a distance signal progression generated by the movement of the functioning section relative to the sensor during operation of the plasticizing screw as the plasticizing screw is moved linearly and rotationally,
      comparing the detected distance signal progression with a stored distance signal progression, and
      issuing a signal representing the type of the functioning section based on a match between the detected distance signal progression and the stored distance signal progression.

20. The method of claim 19, wherein the method further comprises detecting an operating state of the functioning section, and issuing a signal representing the operating state of the functioning section based on a match between the detected distance signal progression and the stored distance signal progression.

21. A plasticizing device for a molding machine comprising:
- a plasticizing cylinder;
- a plasticizing screw arranged in the plasticizing cylinder, the plasticizing screw being rotatable about a longitudinal axis and being linearly movable along the longitudinal axis, and the plasticizing screw comprising a functioning section;
- a control unit for controlling an operation of the plasticizing screw;
- a sensor arranged in or on the plasticizing cylinder, the sensor being configured to measure a distance to a surface of the functioning section of the plasticizing screw; and
- a detecting device for detecting a type of the functioning section, the detecting device being configured to:
  - detect a distance signal progression generated by a movement of the functioning section relative to the sensor,
  - compare the detected distance signal progression with a stored distance signal progression, and
  - issue to the control unit a signal representing the type of the functioning section based on a match between the detected distance signal progression and the stored distance signal progression,
- wherein the control unit is configured to change operating parameters of the plasticizing screw based on the signal representing the type of the functioning section issued by the detecting device.

22. A method for operating a plasticizing device of a molding machine, wherein the plasticizing device comprises:
- a plasticizing cylinder,
- a plasticizing screw arranged in the plasticizing cylinder, the plasticizing screw being rotatable about a longitudinal axis and being linearly movable along the longitudinal axis, and the plasticizing screw comprising a functioning section,
- a control unit for controlling an operation of the plasticizing screw; and
- a sensor arranged in or on the plasticizing cylinder, the sensor being configured to measure a distance to a surface of the functioning section of the plasticizing screw,
- wherein the method comprises detecting a type of the functioning section by:
  - moving the functioning section relative to the sensor,
  - detecting a distance signal progression generated by the movement of the functioning section relative to the sensor,
  - comparing the detected distance signal progression with a stored distance signal progression, and
  - issuing to the control unit a signal representing the type of the functioning section based on a match between the detected distance signal progression and the stored distance signal progression, and
- wherein the method further comprises changing operating parameters of the plasticizing screw via the control unit based on the signal representing the type of the functioning section issued by the detecting device.

* * * * *